US009506655B2

(12) United States Patent
Pieri

(10) Patent No.: US 9,506,655 B2
(45) Date of Patent: Nov. 29, 2016

(54) PROCESS FOR MANUFACTURING A COOKING OVEN, PARTICULARLY FOR FOOD, AND AN OVEN SO OBTAINED

(71) Applicant: TEK REF S.R.L., Simaxis (IT)

(72) Inventor: Luca Pieri, Oristano (IT)

(73) Assignee: TEK REF S.R.L., Simaxis (IT)

( * ) Notice: Subject to any disclaimer, the term of this patent is extended or adjusted under 35 U.S.C. 154(b) by 433 days.

(21) Appl. No.: 14/176,907

(22) Filed: Feb. 10, 2014

(65) Prior Publication Data

US 2014/0224239 A1 Aug. 14, 2014

(30) Foreign Application Priority Data

Feb. 11, 2013 (IT) .............................. MI2013A0186

(51) Int. Cl.
*F24B 1/182* (2006.01)
*A21B 1/33* (2006.01)
*F24B 1/24* (2006.01)
*B29C 70/30* (2006.01)

(52) U.S. Cl.
CPC ................. *F24B 1/182* (2013.01); *A21B 1/33* (2013.01); *B29C 70/30* (2013.01); *F24B 1/24* (2013.01); *Y10T 29/49826* (2015.01)

(58) Field of Classification Search
CPC ....................................................... A21B 1/33
USPC .......................................... 126/21 R; 29/428
See application file for complete search history.

(56) References Cited

U.S. PATENT DOCUMENTS

| | | | | |
|---|---|---|---|---|
| 2,597,627 A | * | 5/1952 | Fader et al. ............ | F24C 3/087 126/21 R |
| 5,219,629 A | * | 6/1993 | Sobolev ................ | B29C 70/028 156/306.6 |
| 5,601,049 A | * | 2/1997 | Hordis ................ | B29C 37/0032 114/357 |
| 6,024,085 A | | 2/2000 | Hodge et al. | |
| 2002/0100404 A1 | * | 8/2002 | Gottfried ................. | A62C 2/06 114/78 |
| 2003/0035961 A1 | * | 2/2003 | Tomokuni ........... | B29C 37/0032 428/423.1 |
| 2004/0130067 A1 | * | 7/2004 | Skinner ................... | B29C 70/48 264/257 |
| 2006/0246182 A1 | * | 11/2006 | McGovern ............... | A21D 8/06 426/94 |
| 2007/0221191 A1 | * | 9/2007 | O'Brien ................... | F24B 1/20 126/25 R |
| 2008/0246379 A1 | | 10/2008 | Choudhary et al. | |
| 2009/0320403 A1 | | 12/2009 | Love | |
| 2010/0050553 A1 | * | 3/2010 | Schofield ................. | E04B 1/14 52/469 |

FOREIGN PATENT DOCUMENTS

DE 37 13 526 A1 2/1998
DE 10 2006 047475 A1 4/2008

OTHER PUBLICATIONS

International Search Report and Written Opinion dated Oct. 18, 2013, issued in Italian Application No. MI20130186, filed Feb. 11, 2013.

* cited by examiner

*Primary Examiner* — Avinash Savani
(74) *Attorney, Agent, or Firm* — Workman Nydegger

(57) ABSTRACT

A process for manufacturing a cooking oven, particularly for food, comprising a step of making a part of the outer covering of the oven as one prefabricated fiberglass piece, is described.

11 Claims, 1 Drawing Sheet

PROCESS FOR MANUFACTURING A COOKING OVEN, PARTICULARLY FOR FOOD, AND AN OVEN SO OBTAINED

CROSS-REFERENCE TO RELATED APPLICATIONS

This application claims priority to Italian Application No. MI2013A000186, filed Feb. 11, 2013, and which applications is incorporated herein by specific reference.

BACKGROUND OF THE INVENTION

1. The Field of the Invention

The present invention refers to a process for manufacturing a cooking oven, particularly for food, and to an oven thus obtained.

2. The Relevant Technology

The present context refers to a cooking oven, especially for cooking food, but it is intended that the oven can be used for cooking different substances or materials that require equivalent cooking temperatures or anyway temperatures that can be reached in the oven itself.

The oven is generally wood-fired, by it can also be of a different type, for example fed by pellet or by a gas burner.

In the following, specific reference will be made, in a non-limitative way, to a wood-fired oven, for example used for cooking food such as pizza.

A wood-fired oven of a known type is made substantially by a case which defines an inner compartment: the upper part of the case is generally dome-shaped, while the lower part is a plane surface used to arrange both the substances subject to cooking and the materials used to light the fire, for example wood.

The case comprises an inner refractory part, an intermediate insulating layer, an outer covering part; everything is supported by a base which can be made of various materials (concrete, brick-cement, metal, wood); a chimney is generally present to let the smoke out.

The main characteristics of such an oven are:
pleasant appearance;
resistance to thermal expansion;
short manufacturing time;
impermeability;
lightness.

In this regard, it should be considered that it is necessary to organize its mass production in an effective way, in order to ensure the reproducibility of the result, obtaining a product having reduced encumbrance and weight in order to facilitate its transport and installation, with the possibility of moving it also after the installation.

Currently the outer covering part is made according to different systems:
  by masonry with plaster and paint; this operation is actually difficult to reproduce in series with the exact shape and colour, and requires also restrictive hygrometric conditions of the environment, which condition the laying of the plastering, e.g., difference between summer and winter;
  by covering with bricks or with a mosaic of small tiles; these operations imply long manufacturing time and their realization has to be given to highly skilled labour, thus an easy mass production is not possible.

These known solutions are thus characterized by the following inconveniences/disadvantages:

excessive weight; this becomes a limitation to the transport of the finished product, as well as an additional burden for the operators who have to move the parts during the manufacturing;
excessive manufacturing time/cost; manual operations made of several steps and requiring skilled labour;
insufficient impermeableness; as known, mortars are not impermeable to water/atmospheric agents;
aesthetic decay; natural ageing of paint and plaster;
low resistance to thermal expansion; generation of cracks as natural expansion joints when the temperature varies.

Some example of embodiment of ovens for household appliances, for example described in DE-3713526-A1 and US 2008/246379-A1, which include, in the constitution of the walls, an intermediate layer of flexible material, non-rigid, composed of mineral fiber (glass wool or rock wool) which has the sole function of thermal insulation. This material is not waterproof and cannot stay in contact with atmospheric agents; it is also irritating to skin contact, letting out micro fibers also dangerous to human health, for example if inhaled. These technical solutions are not suitable to solve the problems underlying the present invention.

It is described in US 2009/0320403-A1 an embodiment of a barbecue (outdoor grill) that in a variant presents a hood made of a mono-layer material, such as phenolic resin or fiberglass. This technical solution is not suitable to solve the problems underlying the present invention, as it has characteristics of insufficient strength and reliability against atmospheric agents, and a tendency to flammability.

SUMMARY OF THE INVENTION

Therefore the aim of the present invention is to provide a process for manufacturing a cooking oven, particularly for food, and an oven thus obtained, aiming to overcome all the aforementioned drawbacks.

The idea at the basis of the invention is to make the part of the outer covering of the oven as one piece of prefabricated rigid composite multilayer based on fiberglass.

Thus the finished product has an improved resistance to thermal expansions, the fiberglass being a material having a high mechanical resistance, it makes the finished oven lighter, having a reduced thickness and finally it protects the oven from the atmospheric agents, being fully impermeable.

Preferably said part of outer covering is provided with an exterior finishing of the type "plastered wall", made of fiberglass mixed with the desired colour.

It is a particular object of the present invention a process for manufacturing a cooking oven, particularly for food, an outer covering for a cooking oven, and an oven thus obtained, as described more fully in the claims that are an integral part of the present description.

BRIEF DESCRIPTION OF THE DRAWINGS

Further aims and advantages of the present invention will become more apparent from the following detailed description of an embodiment thereof (and of its alternative embodiments) and from the annexed drawings, which are supplied by way of non-limiting example, wherein.

The same reference numbers and letters in the figures identify the same elements or components.

DETAILED DESCRIPTION OF THE PREFERRED EMBODIMENTS

Figure 1:
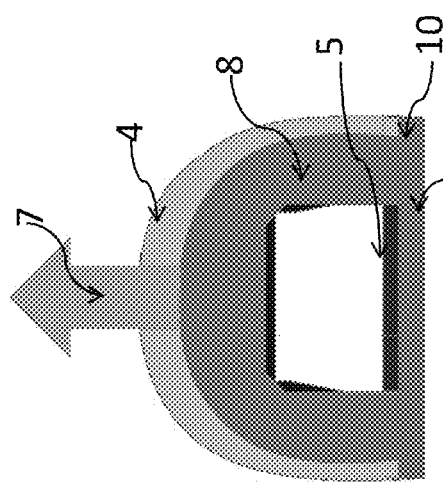
FIG. 1 shows a front view of an oven made in accordance of the invention.
Figure 3:
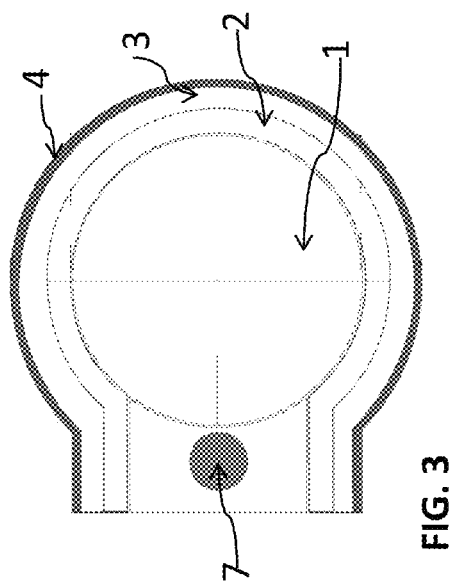
FIG. 3 shows an upper cross section view of the inside of the oven.
Figure 2:
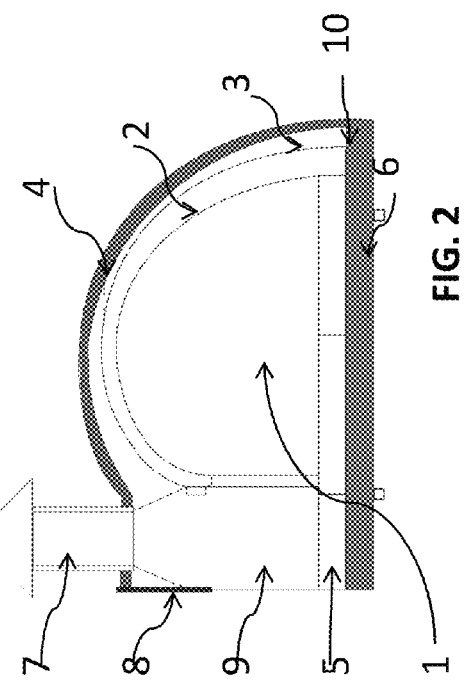
FIG. 2 shows a lateral section view of the inside of the oven.

With reference to the figures, the oven is essentially a case which defines an internal compartment 1: the upper part of the case is generally dome-shaped, while the lower part is a plane surface used to arrange on it both the substances subject to cooking and the materials used to light the fire, for example wood.

In particular, the upper part of the case comprises successive layers:
- an inner layer 2 made of refractory material which faces the internal compartment 1;
- an intermediate layer 3 made of thermal insulating material, for example rock wool;
- an outer covering layer 4.

The lower base part comprises an inner part 5 made of refractory material which faces the inner compartment 1, an intermediate layer 10 made of thermal insulating material, for example lightweight concrete, and an inner support part 6 which can be made of various materials (concrete, brick-cement, wood).

There are also present a chimney 7 as flue, in order to let to smoke out, and an arch 8 surrounding the front mouth 9 of the oven.

In accordance with the main aspect of the present invention, the outer covering part 4 of the oven is made of one piece of prefabricated rigid composite multilayer based on fiberglass.

While the other steps of the manufacturing process as described above are carried out in a way per se known.

In the following, an example of process for manufacturing the outer covering layer of the oven is described.

The fiberglass is a product characterized by a not homogeneous structure, formed by two or more different substances having different physical and chemical properties which remain separate and distinct at a macroscopic and structural level.

The component materials that form the composite materials making up the fiberglass are defined as matrix and reinforcement.

The reinforcement is usually much stiffer than the matrix and gives the fiberglass its solidity. The matrix keeps the reinforcement materials in their position and, since the latter are usually discontinuous, the matrix has also the function of transferring the loads. The combination thus obtained has chemical and physical properties that the single materials used do not have. Each constituent maintains its own identity without be completely dispersed or fused in the other.

Important characteristics obtained are relating to the weight, that is considerably lower than the one of the materials used in the ovens of the type known, an higher resistance to corrosion, a resistance to loads of the cyclical type.

In particular, the manufacturing process of the outer covering layer comprises the sequence of the following steps:

First a mold with the desired shape for the covering is arranged, for example dome-shaped (FIG. 1); the mold is prepared in a way per se known.

A layer of mold-release material, for example wax, is spread on the mold: once the material making the end product dries, the wax will facilitate the release of the mold and its subsequent cleaning.

Over the layer of mold-release material, a layer of isophthalic resin, for example isophthalic gel-coat (used for example in the nautical field for boats or for outdoor products or subject to heavier stresses) is spread using a brush on the whole surface of the mold.

The matrix material (previously prepared, as described particularly in the following) starts to be spread on the whole surface of the mold, then a reinforcement layer buried in the matrix is placed; the reinforcement layer (the latter also described in particular in the following) is, for example, of the foil type, or of the sheet type or of the net type.

This results in a single layer with the reinforcement buried in the matrix.

The previous operation is possibly repeated to spread one or more layers of matrix and reinforcement the one over the other. This after having waited for at least a partial curing of the underlying layers, with a waiting time, for example about 1 hour, depending proportionally on the ambient temperature.

After spreading the last of the desired layers, a first external layer of isophthalic resin, for example the Isophthalic Gel-coat described above, is applied, so that the layering binds solidly to the Gel-Coat forming a single body.

The product thus obtained is extracted from the mold: it is already provided with a first external finishing.

Preferably some of the most critical points are reinforced, for example around the mouth of the chimney/flue 7, spreading a higher quantity of material, to guarantee an improved strength.

A further layer of isophthalic resin is spread, mixed with microspheres (e.g. with a diameter of 0.5 mm) and/or colored pigments, in order to provide a finishing similar to plastering, making the outer covering seem rough.

Preferably, this outer covering layer thus obtained is 2-3 mm thick.

This way a rigid composite multilayer based on fiberglass is obtained.

In the following, further details about the materials used in the procedure described above are described.

As regards the matrix material, a resin of the vinyl ester type is used, mixed with a catalyst, to facilitate the spreading of the latter and a faster drying.

Vinyl ester resins proved to be, for their chemical structure and for the versatility of their formulas, particularly suitable for the use in the present context, wherein the characteristics of chemical resistance, water absorption, thermal resistance and toughness are fundamental requirements. This is also due to the epoxy nature of the basic polymer. The latter is modified by the reaction between the oxirane ring of the epoxy with a carboxyl acid having acrylic unsaturation. The polymer thus obtained is very soluble in crosslinking solvents, such as styrene. Thanks to their epoxy base, the vinyl ester resins show very good adhesive characteristics to the fiberglass. Indeed, the presence of secondary hydroxyl groups in the structure of the polymer allows a high interaction with the silanol and siloxane groups of the fiberglass.

The catalyst mixed to the matrix is preferably of the P200 type, which is a solution of methyl ethyl ketone peroxides in phlegmatizing agents. It is particularly suitable for curing the unsaturated polyester resins (such as the vinyl ester ones) in combination with various accelerating systems; the P200 is a peroxide with a medium crosslinking activity and it can be used in the present production cycle, since it operates at an ambient temperature, for example comprised between 15° C. and 80° C. The concentration of use is preferably comprised between 1% and 2% on the weight of the resin.

As regards the reinforcement layer, a fiberglass is used.

Fiberglass is a material used for producing composite materials, namely advanced structural elements wherein different components are integrated between each other to produce a material having superior mechanical characteristics. Fiberglass is obtained as glass reduced to filaments having diameters smaller than a tenth of millimeter, so that it can lose the characteristic brittleness of the monolithic glass to become a material having a high mechanical resistance and resilience. The fiberglass reaches a mechanical resistance near to the theorical resistance of the covalent bond. Different types of fibres can be distinguished according to their characteristics, which condition their usage. Fiberglass is characterized by:

- high resistance (R=3500-4600 MPa), in practice twice the one of the best steels,
- high stiffness (E=72000-85000 MPa, about the same as aluminium),
- low cost and low electrical and thermal conductivity.

As regards the layer of isophthalic resin, Gel-coat is used, made by isophthalic resins which have a high resistance to organic solvents and to water and to wear.

Gel-coat has the appearance of a thick paint; it is made of a resin which determines its base, of inert fillers and of pigments which give it colour and consistency; furthermore it contains an agent which gives the necessary thixotropy, the main characteristic of the gel coat, which allows its application with large thickness, also vertically. It is a two-component product, and it is applied preferably using a brush or by spraying with a thickness from 0.5 to 1 mm, for example in the present case directly on the mold, previously treated with releasing waxes, reproducing the surface faithfully; if the mold is polished, also the final product will be polished.

The gel-coat creates a smooth surface layer, compact and without porosity which protect the product from atmospheric agents and ultraviolet rays. It creates a barrier against water absorption which may occur because of the capillarity of the fibers on the surface, and reduces the wear caused by the saponification. In addition, the gel-coat has an aesthetic and functional reason: during impregnation, fibers incorporate a large number of small air bubbles and a lot of them communicate with the surface. In a layering without gel-coat, the surface in contact with the mold will be very alveolate, with a multitude of pores and small bubbles, mainly in correspondence of the weave of the fibers. It will then be very difficult to make up for this inconvenience by the simple application of more finishing layers. Furthermore the translucent natural colour of the layering makes it difficult to identify defects. The gel coat creates a compact and uniform layer which avoids all these problems.

The typical temperatures developing in an oven according to the invention are about 400-500° C. in the oven and about 40-70° C. in the fiberglass covering layer.

It will be apparent to the person skilled in the art that other equivalent embodiments, and their combinations, of the invention can be conceived and reduced to practice without departing from the scope of the invention.

The elements and the characteristics shown in the different preferred embodiments can be combined with each other without departing from the scope of the present patent.

The advantages deriving from the application of the present invention are evident:

- standardized mass production of a prefabricated piece; being a product made using a mold, it is possible to realize the product in an industrial way with big economic advantages to the production on a large scale;
- lightness; it is a solution that allows to save a lot of weight compared to the traditional solutions
- resistance; the characteristic of the fiberglass is the high mechanical resistance, which allows the product to withstand possible scratches, bumps . . .
- lower ageing; the material is adapted to stay in contact with atmospheric agents, brackish environments (in the proximity of the sea), extreme temperatures like Scandinavian cold or Arabic hot . . .
- impermeability, it fully protects the insulating lower layer from water; this allows to use the oven even immediately after it stayed a long time in the rain;
- low-cost personalization of the color; fiberglass can be mixed with different colors.

From the description set forth above the person skilled in the art is able to realize the object of the invention without introducing further constructive details.

What is claimed is:

1. A process for manufacturing a cooking oven, particularly for food, said cooking oven comprising: an internal compartment delimited by a case, the upper part of the case comprising an internal layer made of refractory material facing the internal compartment, an intermediate layer made of thermal insulating material, an outer covering layer, the process comprising a step of making said outer covering layer as one piece of prefabricated rigid composite multilayer based on fiberglass, wherein said rigid composite multilayer based on fiberglass comprises:
   - one or more overlapping layers of matrix material with a reinforcement layer buried in the matrix;
   - one surface layer of isophthalic resin internal to the oven; and
   - at least one layer of isophthalic resin external to the oven, said at least one layer of isophthalic resin external to the oven being mixed with microspheres and/or colored pigments.

2. The process according to claim 1, wherein said matrix material comprises resin of the vinyl ester type mixed with catalyst.

3. The process according to claim 1, wherein said reinforcement layer comprises fiberglass.

4. The process according to claim 1, wherein said step of making said outer covering of the oven comprises the following steps in succession:
   - prearranging a mold having a desired shape for the covering;
   - spreading a layer of mold-release material on the mold;
   - spreading an internal layer of isophthalic resin on the mold-release layer;
   - spreading at least one layer of matrix material on said layer of mold-release material, with a reinforcement layer buried in said layer of matrix material;
   - applying a first external layer of isophthalic resin;
   - applying a second external layer of isophthalic resin, mixed with microspheres and/or colored pigments.

5. The process according to claim 4, wherein said step of spreading at least one layer of matrix material comprises spreading several matrix layers and reinforcement layers one over the other, waiting for an underlying layer to cure at least partially prior to applying a next layer.

6. The process according to claim 4, wherein said step of spreading at least one layer of matrix material comprises applying a reinforcement in some areas, obtained by spreading a larger quantity of material.

7. A cooking oven, particularly for food, comprising an outer covering layer manufactured by using a process according to claim 1.

8. An outer covering adapted for a cooking oven, manufactured by means of a process as in claim 1.

9. A process for manufacturing a cooking oven, particularly for food, said cooking oven comprising: an internal compartment delimited by a case, the upper part of the case comprising an internal layer made of refractory material facing the internal compartment, an intermediate layer made of thermal insulating material, an outer covering layer, the process comprising a step of making said outer covering layer as one piece of prefabricated rigid composite multilayer based on fiberglass, wherein said step of making said outer covering lay comprises the following steps in succession:

prearranging a mold having a desired shape for the covering;

spreading a layer of mold-release material on the mold;

spreading an internal layer of isophthalic resin on the mold-release layer;

spreading at least one layer of matrix material on said layer of mold-release material, with a reinforcement layer buried in said layer of matrix material;

applying a first external layer of isophthalic resin; and applying a second external layer of isophthalic resin, mixed with microspheres and/or colored pigments.

10. The process according to claim 9, wherein said step of spreading at least one layer of matrix material comprises spreading several matrix layers and reinforcement layers one over the other, waiting for an underlying layer to cure at least partially prior to applying a next layer.

11. The process according to claim 9, wherein said step of spreading at least one layer of matrix material comprises applying a reinforcement in some areas, obtained by spreading a larger quantity of material.

\* \* \* \* \*